United States Patent
Cerisola

(10) Patent No.: US 7,313,326 B2
(45) Date of Patent: Dec. 25, 2007

(54) METHOD TO INJECT PILOT TONE INTO MICROCONTROLLER-SUPERVISED DWDM TRANSMITTERS

(75) Inventor: Mauro Cerisola, Turin (IT)

(73) Assignee: Avago Technologies Fiber IP ( Singapore) Pte Ltd., Singapore (SG)

( * ) Notice: Subject to any disclaimer, the term of this patent is extended or adjusted under 35 U.S.C. 154(b) by 451 days.

(21) Appl. No.: 10/756,626

(22) Filed: Jan. 13, 2004

(65) Prior Publication Data
US 2004/0146307 A1 Jul. 29, 2004

(30) Foreign Application Priority Data
Jan. 14, 2003 (EP) .................................. 03250217

(51) Int. Cl.
H04B 10/08 (2006.01)
H04B 10/04 (2006.01)
(52) U.S. Cl. ................. 398/32; 398/183; 398/186; 398/192; 398/193; 398/197
(58) Field of Classification Search ............. 398/32, 398/182, 183, 192, 186, 194, 193, 197
See application file for complete search history.

(56) References Cited

U.S. PATENT DOCUMENTS

| 5,373,387 | A | * | 12/1994 | Bosch et al. ............. 398/191 |
| 5,402,433 | A | * | 3/1995 | Stiscia ...................... 372/31 |
| 6,137,522 | A | * | 10/2000 | Melino et al. ............. 347/233 |
| 6,212,001 | B1 | | 4/2001 | Bode et al. |
| 6,373,611 | B1 | * | 4/2002 | Farhan et al. ............. 398/182 |
| 7,012,979 | B2 | * | 3/2006 | Hauptmann et al. ...... 375/355 |
| 2002/0196595 | A1 | * | 12/2002 | Ciancio ................... 361/93.1 |
| 2004/0144913 | A1 | * | 7/2004 | Fennelly et al. ........ 250/214 R |

FOREIGN PATENT DOCUMENTS

WO WO 01/73377 10/2001

\* cited by examiner

*Primary Examiner*—Dalzid Singh

(57) ABSTRACT

The power of a digital signal such as an optical data stream is set via digital-to-analog converter having a reference input for connection to a DC reference signal. The pilot tone is injected into the reference input of the digital-to-analog converter. In the place of a dual amplitude control (modulation current and pilot tone), the disclosed arrangement only requires a single control, thereby reducing cost, power consumption, microcontroller input/output activity, area occupation (PCB real estate) and failure rate.

8 Claims, 2 Drawing Sheets

PRIOR ART

METHOD TO INJECT PILOT TONE INTO MICROCONTROLLER-SUPERVISED DWDM TRANSMITTERS

BACKGROUND OF THE INVENTION

Field of the Invention

The present invention relates to techniques for injecting an AC component (currently referred to as a "pilot tone") into a digital signal, such as a digital data stream.

SUMMARY OF THE INVENTION

The invention was developed by paying specific attention to the possible use in connection with optical signals as transmitted over microcontroller-supervised wavelength division multiplex (WDM) systems, especially of the so-called "dense" type (DWDM). The use of pilot tones produced by pilot tone generators connected to lasers in a DWDM system is disclosed e.g. in U.S. Pat. No. 6,212,001.

However, reference to this preferred field of application is in no way to be construed as limiting the scope of the invention, which is adapted to be applied to all systems where a pilot tone is superimposed over a digital signal.

In that respect, those of skill in the art of electrical communications will promptly appreciate that the same principles briefly described herein by referring to power (which is being done since a optical pulse stream is being considered by way of example), also apply to electrical signals, where reference is more commonly made to signal amplitude (expressed e.g. in terms of signal amplitude or voltage).

In FIG. 1, a digital signal generally indicated as D is shown comprised of a pulsed signal including a stream of optical pulses. The power associated with such pulses may selectively vary between a "low" level $P_0$ and "high" level $P_1$ where $P_{mod}=P_1-P_0$ and $P_{ave}=(P_1+P_0)/2$ represent the power modulation amplitude and the average power value, respectively.

To the optical pulse stream D a pilot tone is superposed in the form of a low-frequency AC sine wave having peak-to-peak power amplitude $P_{tone}$. Referring to the AC component as a "low-frequency" sine wave is intended to mean that the frequency of the pilot tone is usually substantially lower than the repetition rate of the pulses in the data stream D. The ratio of the optical amplitude of the low-frequency component $P_{tone}$ to the average optical power Pave is called modulation depth MD.

The modulation depth MD must remain constant and generally low; otherwise it might cause a penalty in the transmission. In certain cases, it is necessary to adjust the modulation current of the optical source, for instance to deal with the component-to-component or part-to-part spread of slope efficiency value or to compensate the slow efficiency change due to aging of the source.

This will generally entail a change in the pilot tone modulation depth, which in turn requires the amplitude of the pilot tone injected into the optical data stream to be adjusted together with the modulation current.

FIG. 2 is a block diagram of a prior art microcontroller-supervised WDM/DWDM transmitter arrangement including a laser source L having associated a laser driver circuit LD controlled by a microcontroller M.

In the block diagram of FIG. 2, two digital-to-analog converters are designated 10 and 12, respectively. Numeral 14 designates a reference generator generating a reference DC voltage value. Such reference value is fed to the reference inputs of the two digital-to-analog converters 10 and 12. For reasons to be better understood in the following, the reference input of the converter 12 is specifically indicated at 12a.

Based on a control signal provided by the microcontroller M over a first control line CL1, the digital-to-analog converter 10 provides the bias current setting for the laser driver LD.

The block designated 16 is a pilot tone source controlled by the microcontroller M over a control line CL2 in order to determine the frequency of the pilot tone generated by the generator 16. The signal generated by the source 16 is fed to an amplitude control unit 18, which is in turn controlled by the microcontroller M via a pilot tone amplitude control line CL3.

The frequency and amplitude controlled signal from the block 18 is fed to a summation node (adder node) 19 to be added to the output signal of the digital-to-analog converter 12 that is in turn controlled by the microcontroller M via a modulation current control line CL4. The sum signal generated at the node 19 is applied to the laser driver LD as a modulation current ($I_{mod}$) setting.

In the prior art arrangement of FIG. 2, the voltage output from the digital-to-analog converter 12 is used to set the desired modulation current. Usually, the pilot tone source 16 is an oscillator operating under the control of the high-level equipment controller (that is the microcontroller M).

Consequently, changing the amplitude of the pilot tone generated by the source 16 while keeping the modulation depth constant requires the presence of at least one variable element.

Such element is currently selected out of the three possible options.

The first option is a pilot tone source 16 having variable output amplitude. This is not easily available as a commercial component.

Alternatives essentially corresponding to the exemplary embodiment shown in FIG. 2 provide for the block 18 being either a microprocessor-controlled variable-gain amplifier or a microprocessor-controlled variable voltage divider following the pilot tone source 16.

Any other points apart (e.g. a microprocessor-controlled variable-gain amplifier following the pilot tone source 16 does not lend itself to be promptly implemented by resorting to a easily available commercial components), these solutions imply that the microcontroller M must control a variable element in the pilot tone injection circuitry and/or the pilot tone amplitude control.

As a consequence of this, phenomena such as e.g. differential or integral nonlinearities, gain error, offsets and the like may cause a mismatch (tracking error) between the modulation current setting and the pilot tone setting, which in turn leads to the modulation depth being affected by an error with respect to the desired value.

The object of the present invention is thus to provide an improved solution for injecting a pilot tone into a digital signal such as e.g. an optical data stream that overcomes the disadvantages intrinsic in the prior art arrangement considered in the foregoing.

According to the present invention, such an object is achieved by means of a method having the features set forth in the claims that follow. The invention also relates to a corresponding device.

The presently preferred embodiment of the invention is thus a method or device for injecting an AC pilot tone into a digital data stream. In such a preferred embodiment, the power of the digital data stream is set via a digital-to-analog converter having a reference input for connection to a DC reference signal and the pilot tone is injected into the reference input of the digital-to-analog converter.

BRIEF DESCRIPTION OF THE DRAWINGS

The invention will now be described, by way of example only, with reference to the annexed figures of drawing, wherein.

DETAILED DESCRIPTION OF THE PREFERRED EMBODIMENT(s)

Figure 2:
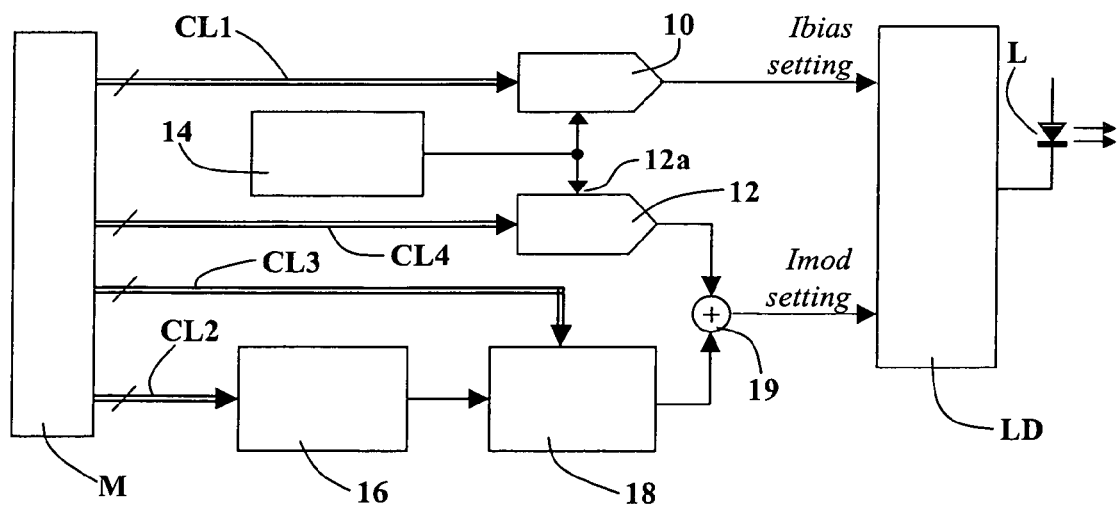
Figure 3:
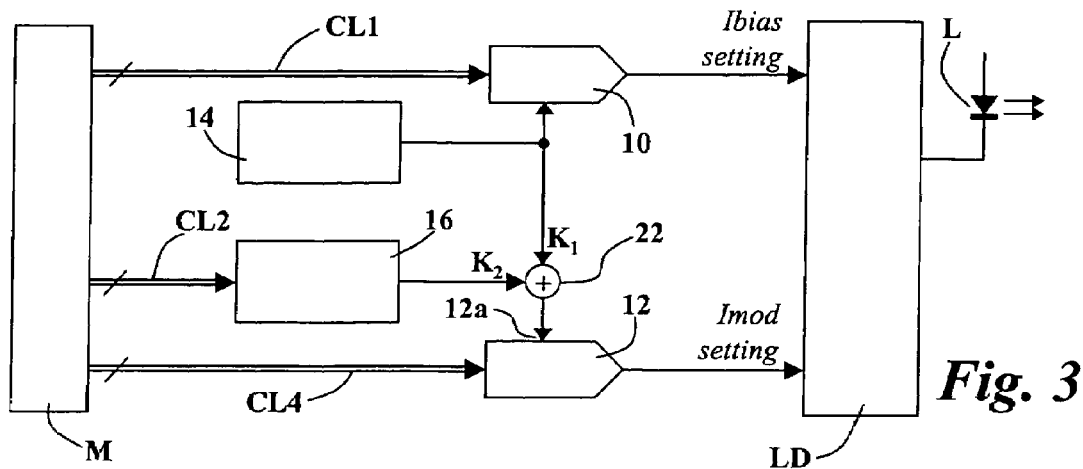
FIG. 3 is a block diagram showing a first possible embodiment of an arrangement according to the invention.
Figure 4:
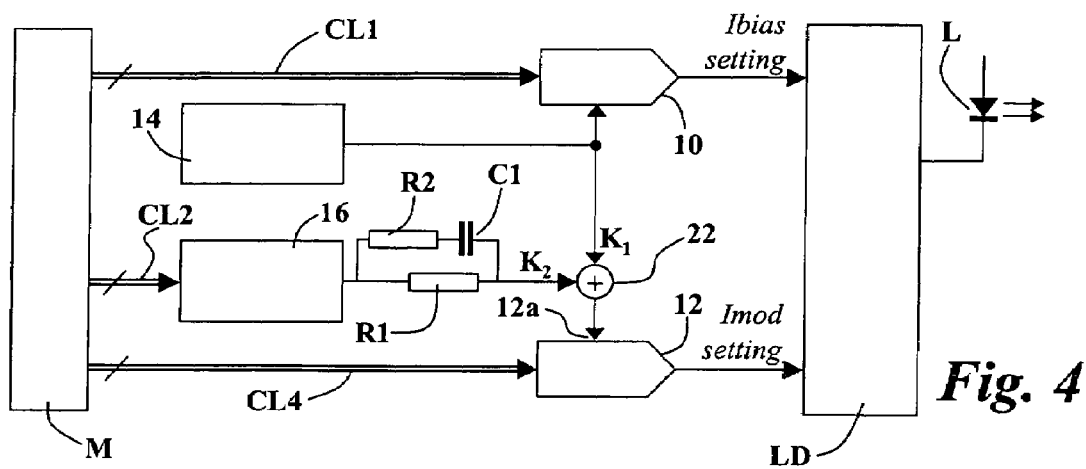
FIG. 4 is a block diagram showing an alternative embodiment of an arrangement according to the invention.
Figure 5:
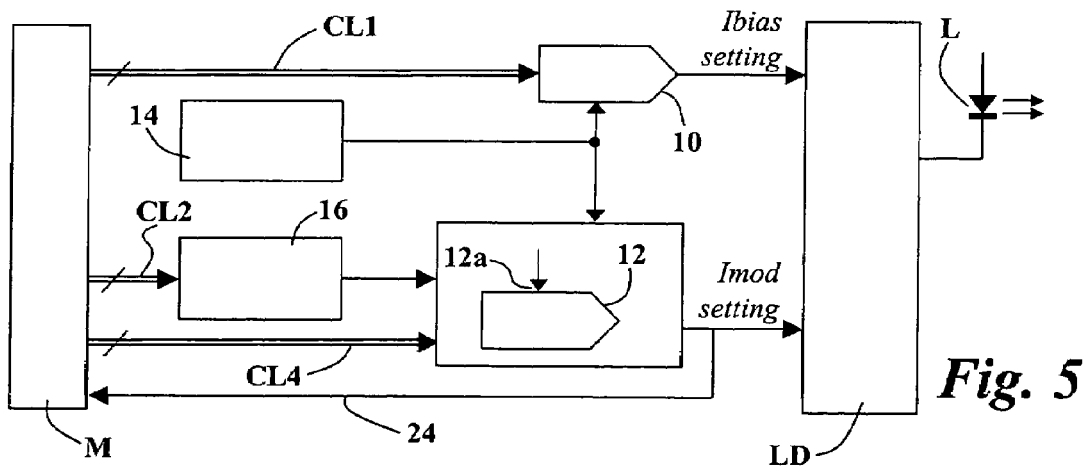
FIG. 5 is a block diagram showing a further possible embodiment of an arrangement according to the invention.

In describing the arrangements shows in FIGS. 3 to 5, the same reference numbers already used in connection with FIG. 2 will be used to indicate parts or components that are identical or equivalent to those are referred to in the foregoing. In addition to making it unnecessary to describe again those parts or components, this choice also highlights that, in addition to improving performance, the solution of the invention also leads to a simplification of the circuitry involved.

In all of the three arrangements shown in FIGS. 3 to 5, the digital-to-analog converter 10 is controlled by the microcontroller M via the line CL1. The digital-to-analog converter 10 thus cooperates with the generator 14 in order to produce the bias setting current $I_{bias}$ for the laser drive circuitry LD. This occurs in an essentially identical manner with respect to the prior art arrangement shown in FIG. 2.

In order to set the modulation current value $I_{mod}$, the arrangements shown in FIGS. 3 to 5 take advantage of the fact that digital-to-analog converters such as the converter 12 derive their output voltage from the voltage supplied to their "reference" input 12a. The output voltage of such a digital-to-analog converter is proportional to the reference input voltage multiplied by the value of the digital setting of the converter. Specifically, the output voltage $V_{out}$ is equal to the reference input voltage $V_{ref}$ multiplied by the value of the digital setting of the converter divided by ((2^number_of_bits_of_the_digital_to_analog_converter)-1).

For instance, for a 10-bit DAC, the following relationship applies:

$$V_{out} = V_{ref} * \text{digital setting}/1023.$$

In the prior art arrangement of FIG. 2, such a reference input is provided by the output of a stable DC source as represented by generator 14.

As apposed thereto, in the arrangements shown in FIGS. 3 to 5, the signal fed to the reference input 12a of the digital-to-analog converter 12 is obtained as a weighted sum of:

the output signal produced by the DC generator 14 (this is essentially a highly stable DC voltage), and the AC signal generated by the pilot tone source generator 16.

The weighting factors applied to the output signal produced by the DC generator 14 and the signal generated by the AC pilot tone source generator are designated $K_1$ and $K_2$, respectively.

As a result of this arrangement, the signal applied to the reference input 12a of the digital-to-analog converter 12 and—consequently—the output of the converter 12 will have a DC component, which sets the modulation current for the optical pulses of the stream D, having superimposed an AC component, which represents the pilot tone.

For every setting of the digital-to-analog converter 12 (as controlled by the digital word provided by the microcontroller M over the line CL4) the ratio of the DC component to the AC component will be constant, whereby the modulation depth will also automatically remain constant.

If the value of DC voltage provided by the generator 14 and the amplitude of the pilot tone produced by generator 16 are known, the modulation depth can be set to the desired value at the design stage, e.g. by simply setting the values $K_1$ and $K_2$. This can be done by properly selecting resistor values in the output stages of generators 14 and 16 or in the input stage implementing the reference input 12a of the digital-to-analog converter 12.

Stated otherwise, even if represented as a separated element, the summation node 22 and the respective weighing factors $K_1$, $K_2$ may in fact be at least partly incorporated to any of the blocks 12, 14, and 16 shown in the drawings.

In the place of a dual amplitude control (modulation current and pilot tone), the arrangement shown in FIGS. 3 to 5 only requires a single control, thereby reducing cost, power consumption, microcontroller input/output activity, area occupation (PCB real estate) and failure rate.

Furthermore, as long as the bandwidth of the signal path from the reference input 12a to the output of the digital-to-analog converter 12 is not exceeded, the arrangement shown herein has intrinsically no mismatch between the DC and AC components at the output of the digital-to-analog converter 12 for any setting value of the converter 12.

If the pilot tone frequency approaches the upper limit of the bandwidth of the converter 12, the AC amplitude at the output of the converter 12 will start to decrease with respect to the expected nominal value. This means that the pilot tone frequency has reached the frequency range where the AC transfer function from the reference input 12a to the output of the digital-to-analog converter 12 exhibits a roll-off and changes the effective modulation depth.

This undesirable effect can be effectively coped with by using a pre-compensation (pre-emphasis) technique, that is by deliberately increasing the amplitude of the pilot tone as fed to the reference input 12a of the converter 12 in order to compensate the high-frequency drop or roll-off in the AC transfer function of the converter 12.

Pre-emphasis is a well-known technique in the area of communications and signal processing and is currently used e.g. in analog FM broadcasting or magnetic tape recording of sound.

A very simple pre-emphasis circuit is shown in FIG. 4 interposed between the output of the pilot tone generator 16 and the summation node 22. In the exemplary embodiment shown, the pre-emphasis network in question includes a resistor R1 connected in parallel to a series connection of a second resistor R2 and a capacitor C1.

By properly choosing the resistor and capacitor values, the bandwidth of the combined circuit (pre-emphasis network plus converter 12) can be increased appreciably, for instance by a factor of 8.5.

Selecting the required values of the resistors R1, R2 and the capacitor C1 in view of the roll-off characteristics experienced at the converter 12 and/or devising alternative pre-emphasis network arrangements fall within the current design ability of the person skilled in the art and, as such, do not require any specific additional description herein.

Figure 1:
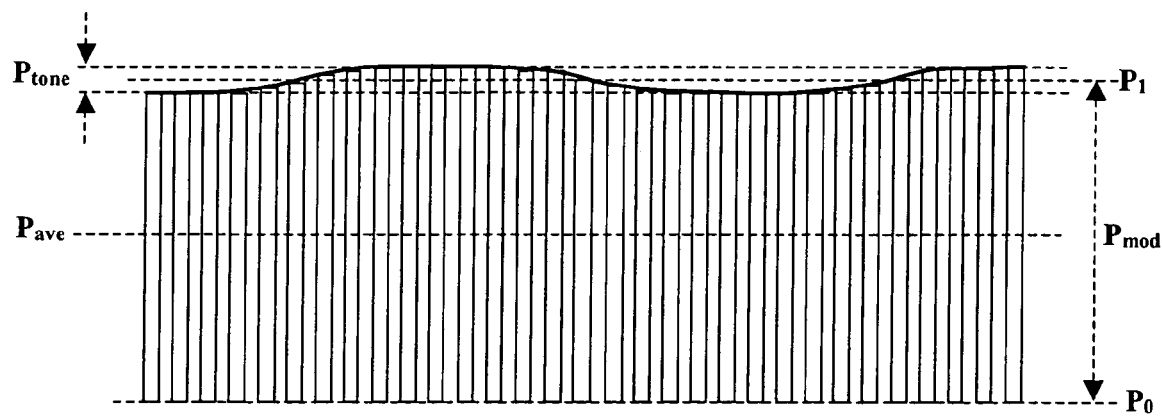
FIGS. 1 and 2 were already discussed in the foregoing.

Closed-loop control of the modulation current settings can be also implemented by using the input to the laser driver LD that sets the modulation current as a sensor signal. In fact, this signal includes both a DC component, which is proportional to the peak-to-peak amplitude of the optical output ($P_{mod}$ in FIG. 1), and an AC component, which is in turn proportional to the amplitude of the pilot tone superimposed to the data stream ($P_{tone}$ in FIG. 1).

By defining the extinction ratio ER as $P_1/P_0=1+(P_{mod}/P_0)$, one can easily show that in a constant-extinction ratio system, if the ratio between $P_{tone}$ (that is the AC component of the $I_{mod}$ setting) and $P_{mod}$ (that is the DC component of the $I_{mod}$ setting) is kept constant, then the modulation depth MD also remains constant.

A corresponding arrangement is shown in FIG. 5 wherein modulation depth control is performed by sensing via a line 24 the DC and the AC components of the signal at the $I_{mod}$ setting input of the laser driver LD. The signal sensed over the line 24 is then transferred to the microcontroller M for processing in view of e.g. maintaining the modulation depth constant.

Of course, without prejudice to the underlying principle of the invention, the details and embodiments may vary, also significantly, with respect to what has been described and shown, by way of example only without departing from the scope of the invention as defined by the annexed claims.

What is claimed is:

1. A method of injecting an AC pilot tone into a digital signal, comprising:
    setting the power of said digital signal via a digital-to-analog converter having a reference input for connection to a DC reference signal;
    injecting said pilot tone into said reference input of digital-to-analog converter;
    providing a laser source for generating said digital signal as a stream of optical pulses, the power of said pulses being set by said digital-to-analog converter;
    providing a laser driver having an input for setting the modulation current of said optical pulses;
    sensing the DC component and the AC component of the signal applied to said sensing input, and
    controlling said digital-to-analog converter as a function said DC and AC components to maintain a constant modulation depth in said stream of optical pulses having said pilot tone superimposed thereon.

2. The method of claim 1, comprising applying to said reference input of said digital-to-analog converter a weighted sum ($K_1$, $K_2$) of said DC reference signal and said AC pilot tone.

3. The method of claim 2, comprising providing, interposed between said DC reference signal and said AC pilot tone and said reference input of said digital-to-analog converter, a summation node for generating said weighted sum.

4. The method of claim 1, wherein said converter has an output and exhibits a transfer function between said reference input and said output, wherein said transfer function has a high-frequency roll-off, the method including associating with said reference input of said digital-to-analog converter a pre-emphasis network for compensating for said roll-off.

5. A device for injecting an AC pilot tone into a digital signal, comprising:
    a digital-to-analog converter wherein the power of said digital signal is set by said digital-to-analog converter, said digital-to-analog converter having a reference input for connection to a DC reference signal;
    a pilot tone source configured to inject said pilot tone into said reference input of said digital-to-analog converter;
    a summation node for receiving said reference signal and said AC pilot tone to generate therefrom a weighted sum ($K_1$, $K_2$) of said DC reference signal and said pilot tone, wherein said weighted sum is applied to said reference input of said digital-to-analog converter.

6. The device of claim 5, wherein said digital-to-analog converter has an output and exhibits a transfer function between said reference input and said output, wherein said transfer function has a high-frequency roll-off, and wherein associated with said reference input of said digital-to-analog converter there is provided a pre-emphasis network for compensating for said roll-off.

7. The device of claim 6, wherein said summation node for generating said weighted sum is interposed between said pre-emphasis network and said reference input of said digital-to-analog converter.

8. The device of claim 5, further comprising:
    a laser source for generating said digital signal as a stream of optical pulses, the power of said optical pulses being set by said digital-to-analog converter;
    a laser driver having an input for setting the modulation current of said optical pulses and, wherein said setting input of the laser driver is set by the output of said digital-to-analog converter;
    a sensing line for sensing the DC component and the AC component of the signal applied to said setting input; and
    a controller unit connected with said sensing line and configured to act on said digital-to-analog converter via said reference input to maintain a constant modulation depth in said stream of optical pulses having superimposed thereon said pilot tone as a function of said sensed DC and AC components.

* * * * *

UNITED STATES PATENT AND TRADEMARK OFFICE
CERTIFICATE OF CORRECTION

| | | |
|---|---|---|
| PATENT NO. | : 7,313,326 B2 | Page 1 of 1 |
| APPLICATION NO. | : 10/756626 | |
| DATED | : December 25, 2007 | |
| INVENTOR(S) | : Mauro Cerisola | |

It is certified that error appears in the above-identified patent and that said Letters Patent is hereby corrected as shown below:

Column 5, Line 44, Claim 1, after "function" insert -- of --.

Signed and Sealed this

Twenty-third Day of November, 2010

David J. Kappos
*Director of the United States Patent and Trademark Office*